(12) United States Patent
Jasinska-Walc et al.

(10) Patent No.: US 11,466,110 B2
(45) Date of Patent: *Oct. 11, 2022

(54) PROCESS FOR PREPARATION OF SEMI-CRYSTALLINE POLYOLEFINIC IONOMERS

(71) Applicant: SABIC GLOBAL TECHNOLOGIES B.V., Bergen Op Zoom (NL)

(72) Inventors: Lidia Jasinska-Walc, Eindhoven (NL); Robbert Duchateau, Roostenlaan (NL); Miloud Bouyahyi, Geleen (NL); Anton Ginzburg, Heerlen (NL); Enrico Troisi, Geleen (NL)

(73) Assignee: SABIC GLOBAL TECHNOLOGIES B.V., Bergen op Zoom (NL)

(*) Notice: Subject to any disclaimer, the term of this patent is extended or adjusted under 35 U.S.C. 154(b) by 134 days.

This patent is subject to a terminal disclaimer.

(21) Appl. No.: 16/956,001

(22) PCT Filed: Dec. 24, 2018

(86) PCT No.: PCT/EP2018/086850
§ 371 (c)(1),
(2) Date: Jun. 19, 2020

(87) PCT Pub. No.: WO2019/122458
PCT Pub. Date: Jun. 27, 2019

(65) Prior Publication Data
US 2021/0309775 A1  Oct. 7, 2021

(30) Foreign Application Priority Data

Dec. 22, 2017 (EP) .................... 17210400
Dec. 22, 2017 (EP) .................... 17210412
Dec. 22, 2017 (EP) .................... 17210434
Dec. 22, 2017 (EP) .................... 17210447
Dec. 22, 2017 (EP) .................... 17210485
Dec. 22, 2017 (EP) .................... 17210534

(51) Int. Cl.

| C08F 210/16 | (2006.01) |
|---|---|
| C08F 8/44 | (2006.01) |
| C08F 210/06 | (2006.01) |
| C08F 8/42 | (2006.01) |
| C08F 210/14 | (2006.01) |
| C08F 220/04 | (2006.01) |
| C08F 2/06 | (2006.01) |
| C08F 4/659 | (2006.01) |
| C08F 4/6592 | (2006.01) |
| C08F 8/12 | (2006.01) |
| C08F 220/64 | (2006.01) |

(52) U.S. Cl.
CPC .......... *C08F 210/06* (2013.01); *C08F 2/06* (2013.01); *C08F 4/65912* (2013.01); *C08F 4/65927* (2013.01); *C08F 8/12* (2013.01); *C08F 8/42* (2013.01); *C08F 8/44* (2013.01); *C08F 210/14* (2013.01); *C08F 210/16* (2013.01); *C08F 220/04* (2013.01); *C08F 220/64* (2013.01); *C08F 2410/01* (2013.01); *C08F 2410/07* (2021.01); *C08F 2420/00* (2013.01); *C08F 2420/02* (2013.01); *C08F 2800/10* (2013.01); *C08F 2810/20* (2013.01); *C08F 2810/50* (2013.01)

(58) Field of Classification Search
CPC .... C08F 210/06; C08F 210/16; C08F 220/02; C08F 220/04; C08F 220/62; C08F 220/64; C08F 8/44; C08F 8/30; C08F 8/32

See application file for complete search history.

(56) References Cited

U.S. PATENT DOCUMENTS

| 3,864,268 A * | 2/1975 | Culbertson ............... C08F 8/06 525/379 |
|---|---|---|
| 4,017,669 A | 4/1977 | Collette et al. |
| 5,646,332 A * | 7/1997 | Cusumano ........... C10M 133/56 560/204 |
| 6,342,622 B1 | 1/2002 | Arts et al. |
| 7,393,907 B2 * | 7/2008 | Imuta .................... C08F 210/00 526/348 |
| 10,472,447 B2 * | 11/2019 | Jasinska-Walc ...... C08F 216/10 |
| 2002/0156207 A1 | 10/2002 | Imuta et al. |
| 2013/0059990 A1 | 3/2013 | Kaji et al. |
| 2014/0275433 A1 * | 9/2014 | Ng ........................... C08F 8/48 422/198 |
| 2021/0087304 A1 | 3/2021 | Bouyahyi et al. |
| 2021/0087310 A1 | 3/2021 | Jasinska-Walc et al. |
| 2021/0087312 A1 * | 3/2021 | Bouyahyi ................. C08F 8/12 |
| 2021/0087313 A1 * | 3/2021 | Bouyahyi ........... C08F 4/65927 |

(Continued)

FOREIGN PATENT DOCUMENTS

| CN | 104693327 A | 6/2015 |
|---|---|---|
| DE | 102014113894 A1 | 4/2015 |

(Continued)

OTHER PUBLICATIONS

International Search Report for International Application No. PCT/EP2018/086850, International Filing Date Dec. 12, 2018, dated Mar. 14, 2019, 5 pages.

(Continued)

*Primary Examiner* — Rip A Lee
(74) *Attorney, Agent, or Firm* — Cantor Colburn LLP

(57) ABSTRACT

The present invention relates to a semi-crystalline polyolefinic ionomer and a process for the preparation of a semi-crystalline polyolefinic ionomer.

19 Claims, No Drawings

(56) References Cited

U.S. PATENT DOCUMENTS

| | | | | |
|---|---|---|---|---|
| 2021/0309775 | A1* | 10/2021 | Jasinska-Walc | .......... C08F 8/12 |
| 2021/0363278 | A1* | 11/2021 | Jasinska-Walc | ...... C08F 210/16 |

FOREIGN PATENT DOCUMENTS

| | | | | |
|---|---|---|---|---|
| EP | 0295076 | A1 | 12/1988 | |
| EP | 1186619 | A2 | 3/2002 | |
| EP | 3034544 | A1 | 6/2016 | |
| EP | 3034545 | A1 | 6/2016 | |
| JP | 2007262338 | A | 10/2007 | |
| WO | 9319104 | A1 | 9/1993 | |
| WO | 9411406 | A1 | 5/1994 | |
| WO | 9613529 | A1 | 5/1996 | |
| WO | 9742236 | A1 | 11/1997 | |
| WO | WO 2009/123228 | A1* | 10/2009 | .............. C08L 23/00 |
| WO | 2016102690 | A1 | 6/2016 | |
| WO | 2017090585 | A1 | 6/2017 | |
| WO | 2017118617 | A1 | 7/2017 | |
| WO | 2019122453 | A1 | 6/2019 | |
| WO | 2019122455 | A1 | 6/2019 | |
| WO | 2019122456 | A1 | 6/2019 | |
| WO | 2019122457 | A1 | 6/2019 | |
| WO | 2019122459 | A1 | 6/2019 | |

OTHER PUBLICATIONS

Written Opinion for International Application No. PCT/EP2018/086850, International Filing Date Dec. 12, 2018, dated Mar. 14, 2019, 5 pages.

Baier et al., "Post-Metallocenes in the Industrial Production of Polyolefins" Angew. Chem. Int. Ed. 2014, 53, 9722-9744.

Boffa, Lisa S. and Novak, Bruce M., "Copolymerization of Polar Monomers with Olefins Using Transition-Metal Complexes", Chem. Rev. 2000, 100, 1479-1493.

Delferro et al., "Multinuclear Olefin Polymerization Catalysts", Chem. Rev. 2011, 111, 2450-2485.

Fernandes S et al. "Copolymerization of ethylene/unsaturated alcohols using nickel catalysts: effect of the ligand on the activity and comonomer incorporation", Journal of Organometallic Chemistry, Elsevier-Sequoia S.A. Lausanne, CH, vol. 690, No. 4, Feb. 14, 2005.

Ferreira M. L. et al: "Effect of Co—and Non-copolymerization Lewis Bases in Propylene Polymerization WITETIND2ZRCL2/MAO" Molecular Chemistry and Physics, Wiley-VCH Verlag, Weinheim, DE, vol. 2020, No. 6, Apr. 18, 2001, pp. 830-839.

Gibson et al. "Advances in Non-Metallocene Olefin Polymerization Catalysis" Chem. Rev. 2003, 103, 283-315.

Ito Shingo et al: "Coordination-Insertion Copolymerization of Allyl Monomers with Ethylene", Journal of the American Chemical Society, American Chemical Society, US, vol. 133, No. 5, Jan. 1, 2011, pp. 1232-1235.

Makio et al., "FI Catalysts for Olefin Polymerization—A Comprehensive Treatment" Chem. Rev. 2011, 111, 2363-2449.

Maria M. Marques et al. "Polymerization with TMA-protected polar vinyl comonomers. I. Catalyzed by group 4 metal complexes with hapto-5-type ligands", Journal of Polymer Science, Part A: Polymer Chemistry, vol. 2. 14, Jul. 15, 1999, pp. 2457-2469.

Mu et al., "Neutral Nickel Catalysts for Olefin Homo—and Copolymerization: Relationships between Catalyst Structures and Catalytic Properties" Chem. Rev. 2015, 115, pp. 12091-12137.

Severn et al. ""Bound but Not Gagged"—Immobilizing Single-Site a-Olefin Polymerization Catalysts" Chem. Rev. 2005, 105, 4073-4147.

T. J. Marks et al. "Cocatalysts for Metal-Catalyzed Olefin Polymerization: Activators, Activation Processes, and Structure-Activity Relationships", Chem. Rev. 2000, 100, 1391-1434.

Van der mee et al: "Thermoreverisble cross-linking of maleated ethylene/propylene copolymers with diamines and amino-alcohols", POLYMER, vol. 49, No. 5, Jan. 20, 2008, pp. 1239-1248.

Zhentian Yu et al. "Olefin terpolymerizations. I. 1, 4-hexadiene", Journal of Polymer Science, Part A: Polymer Chemistry, vol. 33, No. 6, Apr. 30, 1995, pp. 979-987.

* cited by examiner

PROCESS FOR PREPARATION OF SEMI-CRYSTALLINE POLYOLEFINIC IONOMERS

CROSS REFERENCE TO RELATED APPLICATIONS

This application is a National Stage application of PCT/EP2018/086850, filed Dec. 24, 2018, which claims the benefit of European Application No. 17210434.1, filed Dec. 22, 2017, European Application No. 17210412.7, filed Dec. 22, 2017, European Application No. 17210400.2, filed Dec. 22, 2017, European Application No. 17210485.3, filed Dec. 22, 2017, European Application No. 17210447.3, filed Dec. 22, 2017, and European Application No. 17210534.8, filed Dec. 22, 2017, all of which are incorporated by reference in their entirety herein.

BACKGROUND

The present invention relates to a process for the preparation of a semi-crystalline polyolefinic ionomer. The invention further relates to such semi-crystalline polyolefinic ionomer obtained thereby.

Thermoplastic elastomers (TPE), sometimes referred to as thermoplastic rubbers, are a class of copolymers or a physical mix of polymers (usually a plastic and a rubber), which consist of materials with both thermoplastic and elastomeric properties. The cross-links in TPE's can be of physical nature, based on e.g. phase separation, crystallization, ionic or other electrostatic interactions and/or hydrogen bonding, or chemical nature, i.e., reversible covalent bonds.

Polyolefin-based TPE copolymers are typically semi-crystalline polyolefins with varying levels of crystallinity and are typically classified as POP's or POE's. Typically, these are random copolymers of ethylene and α-olefins such as propylene, 1-butene, 1-hexene or 1-octene. The presence of the comonomer disturbs the crystallinity of the polymer and the amount of comonomer determines the softness of the material. A drawback of these materials is that with increasing comonomer content—generally—also the melting point drops, which limits the thermal application window of the material. The upper temperature at which the material can be used decreases, especially since the heat deflection temperature (HDT), which is the temperature at which a polymer deforms under a specific load, may decrease, whereas tensile creep at a certain temperature may increase.

Functionalized polyolefins are known in the art.

For example, EP 3034545 discloses a process for the preparation of a graft copolymer comprising a polyolefin main chain and one or multiple polymer side chains, the process comprising the steps of:

A) copolymerizing at least one first type of olefin monomer and at least one second type of metal-pacified functionalized olefin monomer using a catalyst system to obtain a polyolefin main chain having one or multiple metal-pacified functionalized short chain branches, the catalyst system comprising:
  i) a metal catalyst or metal catalyst precursor comprising a metal from Group 3-10 of the IUPAC Periodic Table of elements;
  ii) optionally a co-catalyst;

B) reacting the polyolefin main chain having one or multiple metal-pacified functionalized short chain branches obtained in step A) with at least one metal substituting agent to obtain a polyolefin main chain having one or multiple functionalized short chain branches;

C) forming one or multiple polymer side chains on the polyolefin main chain, wherein as initiators the functionalized short chain branches on the polyolefin main chain obtained in step B) are used to obtain the graft copolymer.

EP 1186619 discloses inter alia a polar group-containing olefin copolymer comprising a constituent unit represented by the following formula (1), a constituent unit represented by the following formula (2) and a constituent unit represented by the following formula (3), having a molecular weight distribution (Mw/Mn) of not more than 3, and having an intensity ratio of Tαβ to Tαα+ Tαβ (Tαβ/Tαα+ Tαβ)), as determined from a $^{13}$C-NMR spectrum of said copolymer, of not more than 1.0:

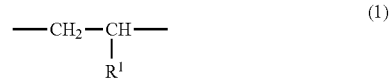

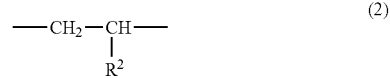

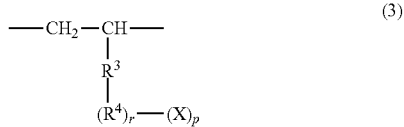

wherein $R^1$ and $R^2$ may be the same or different and are each a hydrogen atom or a straight-chain or branched aliphatic hydrocarbon group of 1 to 18 carbon atoms; $R^3$ is a hydrocarbon group; $R^4$ is a hetero atom or a group containing a hetero atom; r is 0 or 1; X is a polar group selected from an alcoholic hydroxyl group, a phenolic hydroxyl group, a carboxylic acid group, a carboxylic acid ester group, an acid anhydride group, an amino group, an amide group, an epoxy group and a mercapto group; p is an integer of 1 to 3; and when p is 2 or 3, each X may be the same or different, and in this case, if r is 0, X may be bonded to the same or different atom of $R^3$, and if r is 1, X may be bonded to the same or different atom of $R^4$.

WO 97/42236 discloses a process to produce functionalized polyolefins by copolymerizing at least one polar monomer and at least one olefin under effective copolymerization conditions using a catalyst system containing a transition metal complex and a cocatalyst.

The at least one olefin can be the predominate monomer forming the functionalized polyolefin chain. The transition metal complex includes a transition metal having a reduced valency, which is selectable from groups 4-6 of the Periodic Table of the Elements, with a multidentate monoanionic ligand and with two monoanionic ligands. A polar monomer has at least one polar group and that group is reacted with or coordinated to a protecting compound prior to the copolymerization step.

Ionomers are also known in the art and may be prepared by copolymerization of olefins and olefins containing acidic groups followed by treatment with a salt. A problem with many ionomeric materials is that the amount of functionalization of the polymer and the overall molecular structure of the polymer is difficult to control.

There remains a need for a process, which allows the manufacture of ionomers having well controlled polymer functionalization which allows for an accurate tuning of the final ionomers desired properties.

SUMMARY

It is an object of the present invention to provide a polyolefinic material in which the above-mentioned and/or other problems are solved and which allows the manufacture of ionomers, the properties of which can be tuned relatively easily and accurately as desired.

Without willing to be strictly bound to it the present inventors believe that the functionalities of certain functionalized polyolefins tend to cluster which in itself means that a certain degree of cross-linking is inherently present in at least some types of functionalized polyolefins. The present inventors however further found that these cross-links can be enhanced by addition of materials that effectively result in formation of ionic bonds. Such materials are referred to herein as ionomers, more in particular semi-crystalline polyolefinic ionomers.

Accordingly, the present invention provides a process for the manufacture of a semi-crystalline polyolefinic ionomer comprising the steps of:

a1) copolymerizing at least one olefin monomer and at least one masked functionalized olefin monomer in the presence of a catalyst system, wherein the olefin monomer is represented by $CH_2=CHR^1$, wherein $R^1$ is an alkyl group having 1 to 6 carbon atoms, wherein the masked functionalized olefin monomer is a reaction product of a functionalized olefin monomer represented by the structure according to Formula (I) and a masking agent:

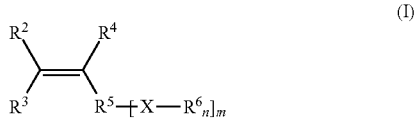

(I)

wherein $R^2$, $R^3$, and $R^4$ are each independently selected from the group consisting of H and hydrocarbyl with 1 to 16 carbon atoms, wherein $R^5-[X-(R^6)_n]_m$ is a polar functional group containing one or multiple heteroatom containing functionalities $X-(R^6)_n$ wherein X is selected from —O—, —S— or —CO$_2$— and $R^6$ is H, and n is 1, or X is N and $R^6$ is each independently selected from the group consisting of H and a hydrocarbyl group with 1 to 16 carbon atoms, and n is 2, wherein $R^5$ is either —C($R^{7a}$)($R^{7b}$)— or a plurality of —C($R^{7a}$)($R^{7b}$)— groups, wherein $R^{7a}$, and $R^{7b}$ are each independently selected from the group consisting of H or hydrocarbyl with 1 to 16 carbon atoms and $R^5$ comprises 1 to 10 carbon atoms, wherein $R^3$ and $R^5$ may together form a ring structure that is functionalized with one or multiple $X-(R^6)_n$, where X is attached to either the main chain or side chain of $R^5$, where m is an entire number between 1 and 10, preferably 1 or 2, and either b1) treating the product of step a1) with a protic solution containing metal salts, ammonium salts or amines to perform an exchange reaction, or a2) contacting the product of a1) with a Brønsted acid solution capable to abstract the residue derived from the masking agent from the functionalized olefin copolymer of step a1) to obtain the semi-crystalline functionalized olefin copolymer comprising the first olefin monomer and the functionalized olefin monomer, and either b2) treating the product of step a2) with a monovalent metal salt, a monocationic ammonium salt or a monofunctional amine, or b3) treating the product of step a2) with a multi-valent metal salt, a polycationic ammonium salt or a polyfunctional amine.

DETAILED DESCRIPTION

In an embodiment the olefin monomer is represented by $CH_2=CHR^1$, wherein $R^1$ is an alkyl group having 1 to 4 carbon atoms.

The product obtained in steps b1, b2 or b3 is a semi-crystalline polyolefinic ionomer. The semi-crystallinity of the copolymer in the composition is determined with differential scanning calorimetry as disclosed herein.

The protic solution in step b1) is a substantially neutral solution meaning a solution having a pH of from 6-8, preferably from 6.5 to 7.5.

A hydrocarbyl in the sense of the invention may be a substituent containing hydrogen and carbon atoms; it is a linear, branched or cyclic saturated or unsaturated aliphatic substituent, such as alkyl, alkenyl, alkadienyl and alkynyl; alicyclic substituent, such as cycloalkyl, cycloalkadienyl cycloalkenyl; aromatic substituent, such as monocyclic or polycyclic aromatic substituent, as well as combinations thereof, such as alkyl-substituted aryls and aryl-substituted alkyls. It may be substituted with one or more non-hydrocarbyl, heteroatom-containing substituents.

A polyolefinic ionomer in the sense of the invention may be for example a polymer material consisting of a thermoplastic resin bearing a fraction of ionized units covalently bonded to the polymer backbone.

A functionalized olefin monomer in the sense of the invention may be an olefin monomer comprising a polar functional group, especially a protic functional group, such as for example an alcohol, an acid, a thiol or an amine.

A polyfunctional protic compound in the sense of the invention may be a compound comprising at least two or more protic functions, such as for example polyfunctional alcohols or amines, such as diols and diamines, whereby a polyfunctional protic compound includes water, especially demineralized water.

The term "semi-crystalline" is known to a skilled person per se. For the avoidance of doubt and in the context of the present invention, semi-crystalline means that a melting endotherm as measured by differential scanning calorimetry (DSC) can be observed. The semi-crystalline functionalized olefin copolymer is determined to be semi-crystalline by DSC if a melting endotherm within the range of 25° C. to 300° C. in the second heating curve at a heating rate of 10° C./min is observed.

Advantageously, the semi-crystalline polyolefinic ionomer according to the invention may have a broad application window, especially a higher heat deflection temperature (HDT) as measured for example according to ASTM 648 and/or a reduced tensile creep at a certain temperature, which may be measured according to ISO899-1 compared to non-functionalized polyolefins with a similar crystallinity or enthalpy. The semi-crystalline polyolefinic ionomers according to the invention may be used as elastomers in higher temperature applications, especially as replacement for TPVs.

A semi-crystalline polyolefinic ionomers according to the invention may comprise at least two types of different reversible cross-links, whereby preferably at least one type of reversible or dynamic cross-links may be based on crystallization and/or at least one type of reversible or dynamic cross-links may be based on electrostatic interactions of ions.

Cross-linked polymer systems containing at least one type of cross-links may be capable of dissipating strain energy, preferably for example leading to an improved toughness and/or fracture toughness.

Cross-linked polymer systems containing at least two types of different cross-links consisting of at least one type of reversible or dynamic cross-links (often called transient) may be capable of dissipating strain energy, preferably for example leading to an improved fracture toughness, and may be capable of storing elastic energy, preferable for example giving rise to shape-memory and self-healing properties.

Having at least two types of different reversible or dynamic cross-links may thereby allow for good processability and/or recyclability at high temperature where network interactions are weakened while still having the full benefit of a dual network system at lower temperatures, where network interactions may improve material properties and/or provide unique material properties.

Shape memory (co)polymers are responsive polymers that can adopt desired deformed temporary shapes upon the simultaneous action of a mechanical deformation and of an external stimulus (i.e., heating above their transition temperature). Furthermore, shape memory (co)polymers can recover their original shapes simply upon applying the same or a different external stimulus (e.g., heating above their transition temperature).

Shape memory (co)polymers generally contain two types of different cross-links, whereby at least one needs to be a reversible cross-link (called transient). When these double cross-linked materials deform, the transient bonds may break and dissipate strain energy. The presence of these transient bonds may also delay macroscopic rupture. Both these effects may contribute to an increase in fracture toughness. When the same materials are heated to break the transient cross-links, deformed and subsequently cooled under strain to reform the transient cross-links, the formation of the transient cross-links fixes the material in the temporary shape. Upon reheating, the transient cross-links may break again so that the system recovers to the initial shape.

Furthermore, reversible or dynamic cross-links that can reform for example upon heating may help with self-healing properties.

According to the invention, the semi-crystalline polyolefinic ionomers may comprise at least two type of different reversible or dynamic cross-links and/or may be used as shape memory copolymers and/or self-healing copolymers and/or may show improved fracture toughness.

Moreover, semi-crystalline polyolefinic ionomers according to the invention that may comprise at least two types of different reversible or dynamic cross-links may be especially easy to process and/or to recycle, preferably while having good mechanical properties and/or a good mechanical stability, especially for example at lower temperatures.

According to the invention, the polyolefinic ionomers obtained in step b1) may comprise electrostatic interactions between monoanionic polar functionalities at the polymer chain and monovalent metal cations (like $Na^+$) or monocationic ammonium ions (like $NH_4^+$).

According to the invention, the semi-crystalline polyolefinic ionomer obtained in step b1), b2) or b3) may comprise electrostatic interactions between multiple monoanionic polar functionalities at the polymer chain and mono- or multi-valent metal cations (like $Na^+$ or $Zn^{2+}$) or monocationic ammonium ions (like $NH_4^+$) or polycationic ammonium ions (like $H_3N^+CH_2CH_2NH_{3+}$).

According to the invention, the polyolefinic ionomers obtained in step b2) or b3) may comprise electrostatic interactions between multiple monoanionic polar functionalities at the polymer chain and multivalent metal cations (like $Zn^{2+}$) or polycationic ammonium ions (like $H_3N^+CH_2CH_2NH_{3+}$).

Cross linked in the sense of the present invention may mean having interactions between different polymer chains. Such interactions may thereby be for example especially be electrostatic interactions.

Electrostatic interactions may thereby be for example electrostatic interactions of anions of different polymers chains with multi valent metal cations (like $Zn^{2+}$) or polycationic ammonium ions (like $H_3N^+CH_2CH_2NH_{3+}$). This may lead to cross-linked semi-crystalline polyolefinic ionomers comprising multi-charge electrostatic interactions.

Alternatively, electrostatic interactions may thereby mean for example electrostatic interactions of anions on different polymers chains with monovalent metal cations (like $Na^+$) or monocationic ammonium ions (like $NH_4^+$). This may lead to cross-linked systems of semi-crystalline polyolefinic ionomers comprising single-charge electrostatic interactions.

In the process of the invention it is preferred that in step b1) or b2) the metal salt is a fluoride, chloride, bromide, iodide, hydroxide, nitrite, nitrate, formate, acetate, bicarbonate, carbonate, sulfite, sulfate, chlorate, perchlorate, bromate or EDTA salt of a metal selected from one or more of lithium, sodium, potassium and silver and/or the monofunctional amine is selected from $NH_3$, $Me_2NH$, $NMe_3$, $EtNH_2$, $Et_3N$, $BuNH_2$ and/or the ammonium salts is a fluoride, chloride, bromide, iodide, hydroxide, nitrite, nitrate, formate, acetate, bicarbonate, carbonate, sulfite, sulfate, chlorate, perchlorate or bromate salt of $NH_4^+$, $Et_3NH^+$, $Bu_4N^+$.

In the process of the invention it is preferred that in step b1) or b3) the multi-valent metal salt is a fluoride, chloride, bromide, iodide, hydroxide, nitrite, nitrate, formate, acetate, bicarbonate, carbonate, sulfite, sulfate, chlorate, perchlorate, bromate or EDTA salts of the magnesium, calcium, strontium, barium, zinc, copper, tin, silver, iron, chrome, aluminum or gallium and/or the polyfunctional amine is selected from ethylene diamine, N,N,N',N'-tetramethyl ethylene diamine, 1,3-diaminopropane, hexamethylenediamine, piperazine, diethylene triamine, N,N,N',N'',N''-pentamethyl diethylene triamine, polyethylenimine.

According to the invention, a polycationic ammonium salt may be the polycationized form of a polyfunctional amine in the sense of the invention, including tetraalkyl ammonium salts.

According to the invention, a Brønsted acid solution is used in step a2) to abstract the residue derived from the masking agent and comprises inorganic and/or organic acids such as hydrochloric acid, hydrobromic acid, hydroiodic acid, hydrofluoric acid or their ammonium salts, phosphoric acid, sulfuric acid, nitric acid, formic acid, acetic acid, citric acid, ethylenediaminetetraacetic acid or partially neutralized carboxylic acid-containing chelates, such as EDTA salts, especially disodium edetate (a disodium salt of EDTA), or combinations of those. The so-called "de-masking" step using a Brønsted acid is known per se.

It was found that the semi-crystalline polyolefinic ionomer prepared according to the invention has a high heat deflection temperature (HDT), good ductile properties at lower temperature as well as low tensile-creep and good elastic properties at higher temperatures, which allow it to be used for various applications. The semi-crystalline polyolefinic ionomer of the invention shows clear elastic hysteresis and do not flow as atactic polypropylene or poly-1-hexene does. The semi-crystalline polyolefinic ionomer is processable at elevated temperatures, indicating that either a thermal reversible or a dynamic cross-linked system (vitrimer) may exist.

The electrostatic interactions within the polyolefinic ionomers can be tuned by selecting the proper type and amount of metal salts (monovalent versus multivalent metal ions), ammonium salts or amines (monofunctional or polyfunctional ammonium salts or amines).

When a monofunctional or polyfunctional amine or ammonium compound is used, the resulting compound is a polyolefinic ionomer at a low temperature while it may not be polyolefinic ionomer at a higher temperature. Thus may be a thermally reversible cross-linked system.

When a metal salt or a tetraalkyl ammonium salt is used, the resulting product remains ionomeric at low and high temperatures, but it becomes fluxional (=processable, moldable) at a high temperature. This is a so-called dynamic cross-linked system, also called vitrimer system.

The semi-crystalline polyolefinic ionomers according to the invention show good abrasion and scuff resistance, chemical resistance, oil resistance, antistatic properties, moisture absorption properties, surface hydrophilic properties, antimicrobial properties and antifungal properties.

The semi-crystalline polyolefinic ionomers according to the invention can be used as an elastomeric or rubbery material. In particular, the semi-crystalline polyolefinic ionomers according to the invention can replace the existing elastomeric material used in high temperature applications such as thermoplastic polyurethane.

The semi-crystalline polyolefinic ionomer according to the invention has a good flowability and processability.

Compared to the copolymerization of ethylene and a masked functionalized olefin, a lower degree of catalyst deactivation may be observed when C3 to C89 olefin monomers are copolymerized with a masked functionalized olefin.

The process for making polar polyolefinic ionomers based on C3 to C8 olefins has a higher reactivity than a process for making olefin copolymers with higher numbers of carbon atoms.

Step a1)
Olefin Monomer

The olefin monomer is represented by $CH_2=CHR^1$, wherein $R^1$ is an alkyl group having 1 to 6 carbon atoms. A C3 to C8 olefin or olefin monomer in the sense of the invention is an olefin monomer comprising 3 to 8 carbon atoms. $R^1$ may be an alkyl group having 1 to 4 carbon atoms.

The polymerization step may use one type of olefin monomer or two or more types of olefin monomer.

Preferably, the at least one type of olefin monomer is or comprises a monomer selected from the group consisting of propylene, 1-butene, 3-methyl-1-butene, 1-pentene, 4-methyl-1-pentene, 1-hexene, vinyl cyclohexane and 1-octene. More preferably, the at least one type of olefin monomer is propylene or 1-hexene or at least two olefin monomers are propylene and 1-hexene.

In an embodiment the at least one olefin monomer is a first and a second olefin monomer, wherein the first and second olefin monomer are different and wherein the amount of the first olefin monomer is at least 75 mol %, preferably at least 85 mol % and the amount of second olefin monomer is at most 25 mol %, preferably at most 15 mol %, the mol % based on the total molar amount of first and second olefin monomer. For example it may be preferred that the first olefin is propylene and the second olefin is 1-hexene.

A single olefin monomer may be preferred, in particular if higher degree of crystallinity are desired. In general the use of mixtures of olefin monomers allows the tuning of the crystallinity characteristics of the polymer made in step a1). Similarly the amount and type of functionalized olefin can be selected so as to influence the desired crystallinity.

In an embodiment therefore only one olefin monomer is used.

In another embodiment only one olefin monomer and one functionalized monomer is used.

Functionalized Olefin Monomer

The functionalized olefin monomer has the following structure and is a reaction product of a compound represented by the structure according to Formula (I) and a masking agent:

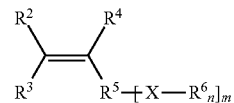

wherein $R^2$, $R^3$, and $R^4$ are each independently selected from the group consisting of H and hydrocarbyl with 1 to 16 carbon atoms, wherein $R^5$—$[X—(R^6)_n]_m$ is a polar functional group containing one or multiple heteroatom containing functionalities $X—(R^6)_n$ wherein X is selected from —O—, —S— or —$CO_2$— and $R^6$ is H, and n is 1, or X is N and $R^6$ is each independently selected from the group consisting of H and a hydrocarbyl group with 1 to 16 carbon atoms, and n is 2, wherein $R^5$ is either —$C(R^{7a})(R^{7b})$— or a plurality of —$C(R^{7a})(R^{7b})$— groups, wherein $R^{7a}$, and $R^{7b}$ are each independently selected from the group consisting of H or hydrocarbyl with 1 to 16 carbon atoms and $R^5$ comprises 1 to 10 carbon atoms, wherein $R^3$ and $R^5$ may together form a ring structure that is functionalized with one or multiple $X—(R^6)_n$, where X is attached to either the main chain or side chain of $R^5$, where m is an entire number between 1 and 10, preferably 1 or 2.

Preferably, X is selected from —O— or —$CO_2$—.

In a preferred embodiment, the functionalized olefin monomer according to Formula I is a hydroxyl- or carboxylic acid-bearing α-olefin or hydroxyl- or carboxylic acid-functionalized ring-strained cyclic olefin monomer, preferably a hydroxyl, a dihydroxyl or carboxylic acid α-olefin monomer.

Hydroxyl-bearing functionalized olefin monomers may correspond for example to Formula I wherein $R^2$, $R^3$, and $R^4$ are each H and wherein X is —O— and wherein $R^5$ is either —$C(R^{7a})(R^{7b})$— or a plurality of —$C(R^{7a})(R^{7b})$— groups, wherein $R^{7a}$, and $R^{7b}$ are each independently selected from the group consisting of H or hydrocarbyl with 1 to 16 carbon atoms.

Examples of $R^5$ groups are —$(CH_2)_9$— and —$(CH_2)_2$—.

Further examples of the hydroxyl-functionalized olefin monomer include, but are not limited to allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol and 10-undecene-1-ol.

Even further examples of functionalized olefin monomer include hydroxyl-functionalized ring-strained cyclic olefins (also called internal olefins), which may be for example typically hydroxyl-functionalized norbornenes, preferably 5-norbornene-2-methanol. They correspond to Formula I wherein $R^2$ and $R^4$ are H and $R^3$ and $R^5$ together for a ring structure that is functionalized with X—H, wherein X is —O—.

Carboxylic acid-bearing functionalized olefin monomers may for example correspond to Formula I wherein $R^2$, $R^3$, and $R^4$ are each H and wherein X is —$CO_2$— and wherein $R^5$ is either —$C(R^{7a})(R^{7b})$— or a plurality of —$C(R^{7a})(R^{7b})$— groups, wherein $R^{7a}$, and $R^{7b}$ are each independently selected from the group consisting of H or hydrocarbyl with 1 to 16 carbon atoms. An example of an $R^5$ group is —$(CH_2)_8$—. Preferred acid functionalized olefin monomers may be selected from the group of 4-pentenoic acid or 10-undecenoic acid.

Accordingly, it is preferred that the functionalized monomer is selected from the group consisting of allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol, 10-undecene-1-ol, 5-norbornene-2-methanol, 3-butenoic acid, 4-pentenoic acid or 10-undecenoic acid, preferably 3-buten-1-ol, 3-buten-2-ol, 10-undecen-1-ol, 4-pentenoic acid and 10-undecenoic acid.

It is preferred that the amount of the functionalized olefin monomers in step a) is from 0.01 to 30 mol %, preferably from 0.02 to 20 mol % or from 0.05 to 10 mol %, with respect to the total molar amount of the olefin monomers and the functionalized olefin monomers. Most preferred is a range of 0.1 to 5 mol %.

The copolymerization of ethylene with functionalized olefin monomers may lead to a certain degree of catalyst deactivation. It was found that the use of C3 to C8 olefins (instead of ethylene) as the olefin monomer unexpectedly resulted in a low degree of catalyst deactivation even when small functionalized olefin monomers are selected as the functionalized olefin monomer.

It was surprisingly found that the copolymer, comprising C3 to C8 olefins as the olefin monomer, could be prepared according to the process according to the invention with a low degree of catalyst deactivation using small functionalized olefin monomers, such as allyl alcohol, 3-buten-1-ol, 3-buten-2-ol, 3-buten-1,2-diol.

Masking Agent

The hydrogen atoms ($R^6$) directly bound to X in the functionalized olefin monomer has a Brønsted acidic nature poisonous to the highly reactive catalyst. A masking agent is used, which can react with the acidic hydrogen and binds to the monomer comprising the polar group. This reaction will prevent a reaction of the acidic polar group (—X—H) with the catalyst and will hamper coordination of the polar group (—X—) to the catalyst.

The molar amount of the masking agent preferably is at least the same molar amount as monomer of formula (I) used in the process according to the invention. Preferably, the molar amount of masking agent is at least 10% higher than the molar amount of monomer of formula (I), or at last 20% higher. Typically, the amount of masking agent is less than 500% of monomer according to formula (I).). In some occasions higher amounts may be used or may be necessary.

Examples of masking agents are silyl halides, trialkyl aluminum complexes, dialkyl magnesium complexes, dialkyl zinc complexes or trialkyl boron complexes. In the process of the invention, it is preferred that the masking agent is selected from trialkyl aluminum complexes, dialkyl magnesium complexes, dialkyl zinc complexes or trialkyl boron complexes. Preferred complexes are trialkyl aluminum complexes. Preferably, these trialkyl aluminum complexes have bulky substituents, like for example isobutyl groups. The most preferred masking agent is triisobutylaluminum.

Metal Catalyst and/or Catalyst Precursor Suitable for the Process According to the Invention.

The process according to the invention is performed in the presence of a suitable catalyst system.

In the section below several examples for single-site catalyst precursors, which may be used to prepare the metal catalyst used in the present invention, are specified. Metal catalysts that are suitable may be obtained by reacting the metal catalyst precursors with a co-catalyst either prior to the use in the polymerization or by in situ reaction with a co-catalyst.

A single-site-catalyst is a catalyst that contains a single, catalytically active, metal center. The metal atom has an open coordination site where it binds olefin monomers, which are subsequently polymerized. Single-site catalysts precursors include those found in *Chem. Rev.* 2000, 100, 1167-1682. A special case of single-site catalysts forms the multinuclear catalysts consisting of different but well-defined (single-site) catalytic sites within one and the same catalyst molecule. Examples of such multinuclear catalysts can be found in *Chem. Rev.* 2011, 111, 2450-2485.

Examples of single-site catalysts are metallocene catalysts. Typically, a metallocene catalyst refers to a sandwich complex comprising a transition metal, group 3 metal or lanthanide coordinated to two members of five-member carbon ring, i.e. substituted cyclopentadienyl (Cp), hetero-substituted five- or six-membered aromatic ring, or a bridged (ansa) ligand consisting of five-member carbon rings and/or hetero-substituted five- or six-membered aromatic rings.

Other examples of single-site catalysts are half-metallocenes. Half-metallocene catalysts in the present description may mean especially for example: a metal catalyst or catalyst precursor typically consisting of one five-member carbon ring, i.e. substituted cyclopentadienyl (Cp), hetero-substituted five- or six membered aromatic ring, bound to a metal active site.

Other examples of single-site catalysts are post-metallocenes. Post-metallocene catalysts in the present description may mean especially for example: a metal catalyst that contains no substituted cyclopentadienyl (Cp) ligands, but may contains one or more anions bound to the metal active site, typically via a heteroatom.

Examples of half-metallocene and post-metallocene catalyst precursors can for example be found in *Chem. Rev.* 2003, 103, 283-315, *Chem. Rev.* 2011, 111, 2363-2449 and *Angew. Chem. Int. Ed.* 2014, 53, 9722-9744. Examples of late transition metal catalysts can for example be found in: *Chem. Rev.* 2015, 115, pp 12091-12137 Examples of supported single-site catalyst systems can for example be found in *Chem. Rev.* 2005, 105, 4073-4147.

It was found that the use of C3 to C6 olefin instead of ethylene as the olefin monomer unexpectedly resulted in a lower degree of catalyst deactivation. This allows the use of a wider variety of catalysts and/or catalyst precursors.

According to the invention, where C3 to C6 olefin monomers are applied, examples of suitable catalysts are so-called metallocene catalysts precursors, including zirconocene and hafnocene dichloride metal catalyst precursors, as for example described in WO2016102690, WO 9411406, U.S. Pat. No. 6,342,622 and WO 2017118617.

In another embodiment, the metal catalysts or metal catalyst precursors is bis(n-butyl-cyclopentadienyl) zirconium dichloride, bis(pentamethylcyclopentadienyl) zirconium dichloride, bis(2-phenyl-indenyl) zirconium dichloride, rac-dimethylsilyl-bis(1-indenyl) zirconium dichloride, rac-dimethylsilyl-bis(2-methyl-1-indenyl) zirconium dichloride, rac-dimethylsilyl-bis(2-methyl-4-phenyl-1-indenyl) zirconium dichloride, diphenylmethylene-(cyclopentadienyl)(2,7-di-t-butyl-fluorenyl) zirconium dichloride, diphenylmethylene-(3-methyl-cyclopentadienyl)(2,7-di-t-butyl-fluorenyl) zirconium dichloride, diphenylmethylene-(3-t-butyl-cyclopentadienyl)(2,7-di-t-butyl-fluorenyl) zirconium dichloride, diphenylmethylene-(cyclopentadienyl)(2,7-di-t-butyl-fluorenyl) hafnium dichloride, diphenylmethylene-(3-methyl-cyclopentadienyl)(2,7-di-t-butyl-fluorenyl) hafnium dichloride, diphenylmethylene-(3-t-butyl-cyclopentadienyl)(2,7-di-t-butyl-fluorenyl) hafnium dichloride, rac-methylene-bis(3-t-butyl-1-indenyl) zirconium dichloride, rac-dimethylmethylene-bis(3-t-butyl-1-indenyl) zirconium dichloride, rac-methylene-bis(3-t-butyl-1-indenyl) hafnium dichloride, rac-dimethylmethylene-bis(3-t-butyl-1-indenyl) hafnium dichloride, rac-dimethylsilyl-bis(1-indenyl) hafnium dichloride, dimethylsilyl(1,3-dimethyl-inden-2-yl)(2,4-diphenyl-inden-1-yl) hafnium dimethyl, dimethylsilyl(2-phenyl-inden-1-yl)(2,3,4,5-tetramethylcyclopentyl) hafnium dimethyl, dimethylsilyl(1,3-dimethyl-inden-2-yl) (2-phenyl-inden-1-yl) hafnium dimethyl, [2,2'-di-(cyclopenta[a]naphthalen-2-yl)biphenyl]zirconium dichloride, [2,2'-bis(cyclopenta[a]naphthalene-2-yl)biphenyl]hafnium dichloride, [2,2'-bis(cyclopenta[a]naphthalene-2-yl)-4,4'-di-tert-butyl biphenyl]zirconium dichloride, [2,2'-bis(cyclopenta[a]naphthalene-2-yl)-4,4'-di-tert-butylbiphenyl]zirconium dichloride, [2,2'-bis(cyclopenta[a]naphthalene-2-yl)-4,4',5,5'-tetramethylbiphenyl]zirconium dichloride, [2,2'-bis(cyclopenta[a]naphthalene-2-yl)-4,4',5,5'-tetramethylbiphenyl]zirconium dichloride, [2,2'-Bis(5-6,7,8,9-tetrahydro-cyclopenta[a]naphthalene-2-yl)-4,4'-di-tertbutyl-biphenyl]zirconium dichloride, rac-diethylsilyl-bis(5-cyclopenta[a]naphthalen-2-yl) zirconium dimethyl, dimethylsilyl(1,3-dimethyl-inden-2-yl)(2,4-diphenyl-inden-1-yl) zirconium dichloride, dimethylsilyl (2-phenyl-inden-1-yl)(2,3,4,5-tetramethylcyclopentyl) zirconium dichloride, dimethylsilyl(1,3-dimethyl-inden-2-yl) (2-phenyl-inden-1-yl) zirconium dichloride, dimethylsilyl (1,3-dimethyl-inden-2-yl) (2-phenyl-cyclopenta[a]naphthalen-3-yl) zirconium dichloride, dimethylsilyl (1,3-dimethyl-inden-2-yl) (2-phenyl-cyclopenta[a]naphthalen-3-yl) hafnium dimethyl.

In another embodiment, the metal catalysts or metal catalyst precursors are rac-dimethylsilyl bis(2-methyl-4-phenyl-1-indenyl) zirconium dichloride, dimethylsilyl bis(1,3-dimethyl-inden-2-yl)(2,4-diphenyl-inden-1-yl) hafnium dimethyl, dimethylsilyl (1,3-dimethyl-inden-2-yl)(2-phenyl-cyclopenta[a]naphthalen-3-yl) zirconium dichloride.

The metal catalysts or metal catalyst precursors for use in the present invention may also be from the group of metal catalysts or metal catalyst precursors having no cyclopentadienyl groups, in other words, non-cyclopentadienyl metal catalysts or metal catalyst precursors.

In a preferred embodiment of the metal catalyst precursor is [N-(2,6-di(I-methylethyl)phenyl)amido)(2-isopropylphenyl) (α-naphthalen-2-diyl(6-pyridin-2-diyl)methane)]hafnium dimethyl or bis[2-(1,1-dimethylethyl)-6-[(pentafluorophenylimino)methyl] phenolato] titanium dichloride.

Co-Catalysts

A co-catalyst can be used when a metal catalyst precursor is applied. The function of this co-catalyst is to activate the metal catalyst precursor. Co-catalysts may be selected for example from the group consisting of aluminum alkyls and aluminum alkyl halides, such as for example triethyl aluminum (TEA) or diethyl aluminum chloride (DEAC), MAO, DMAO, MMAO, SMAO, solid MAO, possibly in combination with aluminum alkyls, for example triisobutyl aluminum, and/or with a combination of an aluminum alkyl, for example triisobutyl aluminum, and a fluorinated aryl borane or fluorinated aryl borate (viz. B(R')$_y$ wherein R' is a fluorinated aryl and y is 3 or 4, respectively). Examples of a fluorinated borane is B(C$_6$F$_5$)$_3$ and of fluorinated borates are [X]$^+$[B(C$_6$F$_5$)$_4$]$^-$ (e.g. X=Ph$_3$C, C$_6$H$_5$N(H)Me$_2$). For more examples see for example *Chem. Rev.* 2000, 100, 1391-1434.

MAO generally contains significant quantities of free trimethyl aluminum (TMA), which can be removed by drying the MAO to afford the so-called depleted MAO or DMAO.

Alternatively to drying the MAO, when it is desired to remove the free trimethyl aluminum, a bulky phenol such as butylhydroxytoluene (BHT, 2,6-di-t-butyl-4-methylphenol) can be added which reacts with the free trimethyl aluminum.

Supported MAO (SMAO) may also be used and may be generated by the treatment of an inorganic support material, typically silica, by MAO. Solid MAO may also be used and may be generated as described in US2013/0059990 and WO 2017090585 A1.

Other examples of polymeric or oligomeric aluminoxanes are tri(isobutyl) aluminum- or tri(n-octyl) aluminum-modified methylaluminoxane, generally referred to as modified methylaluminoxane, or MMAO.

Neutral Lewis acid modified polymeric or oligomeric aluminoxanes may also be used, such as alkylaluminoxanes modified by addition of a hydrocarbyl substituted Group 13 compound having 1 to 30 carbons, especially a tri(hydrocarbyl) aluminum- or tri(hydrocarbyl) boron compounds, or a halogenated (including perhalogenated) derivatives thereof, having 1 to 10 carbons in each hydrocarbyl or halogenated hydrocarbyl group, more especially a trialkyl aluminum compound.

In the present invention, MAO, DMAO, SMAO, solid MAO and MMAO may all be used as co-catalyst.

In addition, for certain embodiments, the metal catalyst precursors may also be rendered catalytically active by a combination of an alkylating agent and a cation forming agent which together form the co-catalyst, or only a cation forming agent in the case the catalyst precursor is already alkylated, as exemplified in T. J. Marks et al., *Chem. Rev.* 2000, 100, 1391. Suitable alkylating agents are trialkyl aluminum compounds, preferably triisobutylaluminum TIBA. Suitable cation forming agents for use herein include (i) neutral Lewis acids, such as C1-30 hydrocarbyl substituted Group 13 compounds, preferably tri(hydrocarbyl)boron compounds and halogenated (including perhalogenated) derivatives thereof, having from 1 to 10 carbons in each hydrocarbyl or halogenated hydrocarbyl group, more preferably perfluorinated tri(aryl)boron compounds, and most preferably tris(pentafluorophenyl) borane, (ii) non polymeric, compatible, non-coordinating, ion forming compounds of the type [C]⁺[A]⁻ where "C" is a cationic group such as ammonium, phosphonium, oxonium, silylium or sulfonium groups and [A]⁻ is an anion, especially for example a borate.

Non-limiting examples of the anionic ["A"] are borate compounds such as C1-30 hydrocarbyl substituted borate compounds, preferably tetra(hydrocarbyl)boron compounds and halogenated (including perhalogenated) derivatives thereof, having from 1 to 10 carbons in each hydrocarbyl or halogenated hydrocarbyl group, more preferably perfluorinated tetra(aryl)boron compounds, and most preferably tetrakis(pentafluorophenyl) borate.

A supported catalyst may also be used, for example using SMAO as the co-catalyst. The support material can be an inorganic material. Suitable supports include solid and particulated high surface area, metal oxides, metalloid oxides, or mixtures thereof. Examples include: talc, silica, alumina, magnesia, titania, zirconia, tin oxide, aluminosilicates, borosilicates, clays, and mixtures thereof.

Preparation of a supported catalyst can be carried out using methods known in the art, for example i) a metal catalyst precursor can be reacted with supported MAO to produce a supported catalyst; ii) MAO can be reacted with a metal catalyst precursor and the resultant mixture can be added to silica to form the supported catalyst; iii) a metal catalyst precursor immobilized on a support can be reacted with soluble MAO.

Alternatively, solid MAO can be used as cocatalyst creating a supported catalyst.

Scavengers

A scavenger can optionally be added in the catalyst system in order to react with impurities that are present in the polymerization reactor, and/or in the solvent and/or monomer feed. This scavenger prevents poisoning of the catalyst during the olefin polymerization process. The scavenger can be the same as the co-catalyst but can also independently be selected from the group consisting of aluminum hydrocarbyls (e.g. triisobutyl aluminum, trioctyl aluminum, trimethyl aluminum, MAO, MMAO, SMAO), zinc hydrocarbyls (e.g. diethyl zinc) or magnesium hydrocarbyls (e.g. dibutyl magnesium).

Some masking agents may also function as scavengers and some scavengers may also function as masking agents.

The process according to the invention is best performed in a solution process using a soluble homogeneous- or insoluble heterogeneous catalyst system as described above.

In the process, the polymerization conditions, like for example temperature, time, pressure, monomer concentration can be chosen within wide limits. The polymerization temperature is in the range from −10 to 250° C., preferably 0 to 220° C., more preferably 25 to 200° C. The polymerization time is in the range of from 10 seconds to 20 hours, preferably from 1 minute to 10 hours, more preferably from 5 minutes to 5 hours. The molecular weight of the polymer can be controlled by use of hydrogen or other chain transfer agents like silanes, boranes, zinc alkyls or excess aluminum alkyl species in the polymerization process. The polymerization may be conducted by a batch process, a semi-continuous process or a continuous process and may also be conducted in two or more steps of different polymerization conditions. The polyolefin produced is separated from the polymerization solvent and dried by methods known to a person skilled in the art.

In an embodiment, a hindered phenol, such as for example butylhydroxytoluene (BHT), may be added during the polymerization process, especially for example in an amount between 0.1 and 5 mol. equivalents of main group metal compound(s) used as scavenger, cocatalyst and/or masking agent. This may contribute to increase molecular weight and/or comonomer incorporation.

In an embodiment, a hindered phenol, such as for example butylhydroxytoluene (BHT), may be added during the polymerization process, especially for example in an amount between 0.1 and 5 mol. equivalents of main group metal compound(s) or silyl compound(s). This may contribute to increase molecular weight and/or comonomer incorporation.

Preferably, the amount of the functionalized olefin monomers in step a1) is 0.01 to 30 mol %, more preferably 0.02 to 20 mol % or 0.10 to 10 mol %, further preferably from 0.05 to 5 mol %, with respect to the total of the olefin monomers and the functionalized olefin monomers.

The invention may involve a further addition of other additives such as a processing stabilizer (primary antioxidant) such as Irganox 1010.

Product

The process of the invention may yield a semi-crystalline functionalized olefin copolymer, wherein the content of functionalized olefin monomer is between 0.01 and 30 mol %, preferably between 0.02 to 20 mol % or 0.05 to 10 mol %, more preferably from 0.1-5 mol % with respect to the total of the olefin monomers and the functionalized olefin monomers in the copolymer. By means of further treatment of the said semi-crystalline functionalized olefin copolymer the amorphous polyolefinic ionomer according to the invention is obtained.

The present invention relates to an amorphous polyolefinic ionomer obtainable or obtained by the process as disclosed herein.

More in particular, the invention relates to a semi-crystalline polyolefinic ionomer obtainable by the process of the invention wherein, said at least one olefin monomer is selected from the group consisting of propylene, 1-butene, 3-methyl-1-butene, 1-pentene, 4-methyl-1-pentene, 1-hexene, vinyl cyclohexane and 1-octene, said at least one functionalized olefin monomer is selected from the group consisting of allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol, 10-undecene-1-ol, 5-norbornene-2-methanol, 3-butenoic acid, 4-pentenoic acid or 10-undecenoic acid, preferably 3-buten-1-ol, 3-buten-2-ol, 10-undecen-1-ol, 4-pentenoic acid and 10-undecenoic acid, and wherein the functionalized groups in the ionomer are cross-linked by means of one or more from the group consisting of monovalent metal ions, monocationic ammonium ions, monofunctional amines, multivalent metal ions, polycationic ammonium ions and polyfunctional amines.

In a preferred embodiment the semi-crystalline polyolefinic ionomer comprises between 0.1 and 10 molar equivalent, preferably between 0.2 and 8 molar equivalent, further preferred between 0.4 and 5 molar equivalent, of a metal salt, an ammonium salt or an amine with respect to the mol % of functionalized olefin monomers incorporated in the copolymer.

The invention thus also concerns a semi-crystalline polyolefinic ionomer, wherein the content of functionalized olefin monomer is between 0.01 and 30 mol %, preferably between 0.02 to 20 mol % or 0.05 to 10 mol %, with respect to the total of the olefin monomers and the functionalized olefin monomers in the copolymer.

The invention thus further concerns a semi-crystalline polyolefinic ionomer according to the invention, wherein the olefin monomer is selected from propylene, 1-butene, 3-methyl-1-butene, 1-pentene, 4-methyl-1-pentene, 1-hexene, vinyl cyclohexane and 1-octene and/or wherein two olefin monomers, preferably propylene and 1-hexene, are used.

A semi-crystalline polyolefinic ionomer according to the invention, may thereby be so that the functionalized olefin monomer is selected from the group consisting of allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol, 10-undecene-1-ol, 5-norbornene-2-methanol, 3-butenoic acid, 4-pentenoic acid or 10-undecenoic acid, preferably 3-buten-1-ol, 3-buten-2-ol, 10-undecen-1-ol, 4-pentenoic acid and 10-undecenoic acid.

A semi-crystalline polyolefinic ionomer according to the invention, may be so that the amount of propylene in the semi-crystalline polyolefinic ionomer is preferably at least 50 wt %, preferably >60 wt %, further preferred >70 wt %, further preferred >80 wt % with respect to the total of the olefin monomers and the functionalized olefin monomers in the copolymer. Especially for example when the at least one type of olefin monomer is a combination of propylene and a further olefin monomer such as 1-hexene, the amount of propylene in the semi-crystalline polyolefinic ionomer is preferably at least 50 wt %, preferably >60 wt %, further preferred >70 wt %, further preferred >80 wt %.

A semi-crystalline polyolefinic ionomer according to the invention, may be so that it comprises between 0.1 and 100 mol. equivalent, preferably between 0.1 and 10 mol. equivalent, more preferably between 0.2 and 8 mol. equivalent, further preferred between 0.4 and 5 mol. equivalent, of a metal salt, an ammonium salt or an amine with respect to the mol % of functionalized olefin monomers incorporated in the copolymer and/or comprises at least two types of different reversible cross-links.

A semi-crystalline polyolefinic ionomer according to the invention, may be so that it comprises single-charge electrostatic interactions and between 0.1 and 10 mol. equivalent, preferably between 0.2 and 8 mol. equivalent, further preferred between 0.4 and 5 mol. equivalent, of a salt of monovalent metal, an ammonium salt or a monofunctional amine with respect to the mol % of functionalized olefin monomers incorporated in the copolymer.

A semi-crystalline polyolefinic ionomer according to the invention, may be so that it comprises multi-charge electrostatic interactions and comprises between 0.05 and 10 mol. equivalent, preferably between 0.2 and 8 mol. equivalent, further preferred between 0.4 and 5 mol. equivalent, of a salt of a multi-valent metal, a polyfunctional ammonium salt or a polyfunctional amine with respect to the mol % of functionalized olefin monomers incorporated in the copolymer.

A semi-crystalline polyolefinic ionomer according to the invention, may be so that it a monovalent metal salt may be a fluoride, chloride, bromide, iodide, hydroxide, nitrite, nitrate, formate, acetate, bicarbonate, carbonate, sulfite, sulfate, chlorate, perchlorate, bromate or EDTA salts selected from the alkali metals Li, Na, K, Ag and/or a monofunctional amine may be selected from $NH_3$, $Me_2NH$, $NMe_3$, $EtNH_2$, $Et_3N$, $BuNH_2$ and/or an ammonium salt may be a fluoride, chloride, bromide, iodide, hydroxide, nitrite, nitrate, formate, acetate, bicarbonate, carbonate, sulfite, sulfate, chlorate, perchlorate or bromate salts of $NH_4^+$, $Et_3NH^+$, $Bu_4NH^+$ and/or a multivalent metal salt may be a fluoride, chloride, bromide, iodide, hydroxide, nitrite, nitrate, formate, acetate, bicarbonate, carbonate, sulfite, sulfate, chlorate, perchlorate, bromate or EDTA salts of the following metals Mg, Ca, Sr, Ba, Zn, Cu, Sn, Ag, Fe, Cr, Al, Ga and/or a polyfunctional amine may be selected from ethylene diamine, N,N,N',N'-tetramethyl ethylene diamine, 1,3-diaminopropane, hexamethylenediamine, piperazine, diethylene triamine, N,N,N',N'',N''-pentamethyl diethylene triamine, polyethylenimine.

A semi-crystalline polyolefinic ionomer according to the invention, may be so that the amount of propylene in the semi-crystalline polyolefinic ionomer is preferably at least 50 wt %, preferably >60 wt %, further preferred >70 wt %, further preferred >80 wt % with respect to the total of the olefin monomers and the functionalized olefin monomers in the copolymer. Especially for example when the at least one type of olefin monomer is a combination of propylene and a further olefin monomer such as 1-hexene, the amount of propylene in the semi-crystalline polyolefinic ionomer is preferably at least 50 wt %, preferably >60 wt %, further preferred >70 wt %, further preferred >80 wt %.

A semi-crystalline polyolefinic ionomer according to the invention, may be so that the melting enthalpy is between 5 J/g and 150 J/g, preferably between 10 J/g and 120 J/g, further preferred between 12 J/g and 100 J/g, further preferred between 13 J/g and 90 J/g, further preferred between 14 J/g and 80 J/g, further preferred between 15 J/g and 65 J/g as measured by DSC (with the equipment and method indicated in the examples below).

In an embodiment, the present invention also relates to a thermoplastic composition comprising the ionomer of the invention disclosed herein. Such a thermoplastic composition further comprises at least one thermoplastic polymer is selected from the group consisting of polyolefins such as random polypropylene, polypropylene homopolymer, heterophasic polypropylene copolymers, high density polyethylene, low density polyethylene, linear low density polyethylene, ethylene-propylene copolymers, polyesters, polycarbonates, polyester-carbonates, polyurethanes, polyethers, polyetherimides, polyamides, polystyrene, polyphenylene-oxide, polyacrylates, olefin-acrylate copolymers, polysulfones.

Such a thermoplastic composition may also further comprise at least one inorganic or organic filler material selected from the group consisting of metal oxides and such as titanium oxide, zirconium oxide, aluminum oxide, zinc oxide, iron oxide, metal carbonates such as calcium carbonate, metal sulfates such as calcium sulfate, silicates such as montmorillonite, smectite, talcum, mica, aluminum silicate, silica, glass, carbon-based filler such as carbon black, graphite, graphene, carbon nanotubes.

For the avoidance of doubt, it is to be understood that in the thermoplastic composition the ionomer preferably forms a minor portion of the thermoplastic composition. Thus, the amount of ionomer is preferably at most 30, preferably at most 15 wt. % on the basis of the weight of the thermoplastic composition.

For the avoidance of doubt, it is to be understood that the copolymer prepared in step a1) of the process of the invention or the copolymer in the claimed composition is a random copolymer.

It is noted that the invention relates to all possible combinations of features described herein, preferred in particular are those combinations of features that are present in the claims. It is in particular noted that the preferred materials or preferred amounts of materials as disclosed in the context of the process according to the invention equally apply to the semi-crystalline polyolefinic ionomer.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

When values are mentioned for a lower limit and an upper limit for a parameter, ranges made by the combinations of the values of the lower limit and the values of the upper limit are also understood to be disclosed.

The invention is now elucidated by way of the following non-limiting examples.

EXAMPLES $^1$H NMR Characterization

The percentage of functionalization was determined by 1H NMR analysis carried out at 130° C. using deuterated tetrachloroethane (TCE-D2) as solvent and recorded in 5 mm tubes on a Varian Mercury spectrometer operating at a frequency of 400 MHz. Chemical shifts are reported in ppm versus tetramethylsilane and were determined by reference to the residual solvent protons.

High Temperature Size Exclusion Chromatography (HT-SEC)

The molecular weights, reported in kg/mol, and the PDI were determined by means of high temperature size exclusion chromatography, which was performed at 150° C. in a GPC-IR instrument equipped with an IR4 detector and a carbonyl sensor (PolymerChar, Valencia, Spain). Column set: three Polymer Laboratories 13 μm PLgel Olexis, 300× 7.5 mm. 1,2-Dichlorobenzene (o-DCB) was used as eluent at a flow rate of 1 mL-min-1. The molecular weights and the corresponding PDIs were calculated from HT SEC analysis with respect to narrow polystyrene standards (PSS, Mainz, Germany).

Differential Scanning Calorimetry (DSC)

Thermal analysis was carried out on a DSC Q100 from TA Instruments at a heating rate of 5° C.·min$^{-1}$. First and second runs were recorded after heating up to 210° C. and cooling down⁻ to ca. −40° C. at a rate of 10° C.-min. All copolymers were found to be semi-crystalline as determined by DSC. The melting enthalpy was calculated as the area under the peak from the melting transition in DSC.

Example 1

The copolymerization reaction of propylene with 10-undecenoic acid (entry 1, Table 1) was carried out in a stainless steel autoclave (2.2 L). The reactor, equipped with a mechanical stirrer, was operated at 900 rpm. The reactor was first flushed with propylene for at least 30 minutes. Pentamethylheptane diluent (300 mL), solutions of TiBA-pacified 10-undecenoic acid (TiBA:10-undecenoic acid=2:1, 1.0 M, 25 mmol) and MAO (30 wt % solution in toluene, 9 mmol) were added followed by the introduction of an additional amount of TiBA solution (1.0 M solution in toluene, 4.0 mmol) and DEZ (1.0 M solution in toluene, 1 mmol). Pentamethylheptane was added to bring the total volume to 1 L. The reactor was then heated to 87° C. and the pressure was brought to 9 bar with propylene. A solution of rac-Me$_2$Si(2-Me-4-Ph-Ind)$_2$ZrCl$_2$ catalyst precursor prepared in a glovebox by dissolving 4 mg of solid precatalyst in 5 mL toluene (~6.4 μmol) was injected into the reactor applying an over pressure of nitrogen. The reactor temperature was kept at 87±3° C. by cooling with an oil LAUDA system. At the end of the reaction, the mixture was collected via a bottom drain valve in a beaker containing water/isopropanol mixture (50 wt. %, 500 mL) and Irganox 1010 (1.0 M, 0.5 mmol) and the resulting suspension was filtered, washed with demineralized water (2×500 mL) and dried at 60° C. in vacuo overnight (yield 57 g). The resulting ionomer product was analyzed by DSC and ICP-MS.

To determine the molecular weight, polydispersity and functionalized comonomer incorporation in the polyolefinic ionomer, the product was dispersed in toluene containing hydrochloric acid (5 M, 1-5 v %) and heated until a clear solution was obtained. The resulting mixture was cooled down and precipitated in an excess iPrOH. The obtained solid was washed with demineralized water and dried at 60° C. in vacuo overnight. The resulting carboxylic acid randomly functionalized polypropylene was analyzed by HT-SEC to determine the molecular weight, DSC to determine the T$_g$ and $^1$H NMR to determine the percentage of functionalization.

Example 2

The copolymerization reaction of propylene, 1-hexene and TiBA-pacified 10-undecen-1-ol (entry 3, Table 2) was carried out in a stainless steel Büchi reactor (0.3 L). Toluene solutions of the catalyst precursor rac-Me$_2$Si(2-Me-4-Ph-Ind)$_2$ZrCl$_2$ (0.4 μmol) and of TiBA-pacified 10-undecen-1-ol comonomer (TIBA:10-undecen-1-ol=1:1; 1.0 M, 10 mmol) were prepared in a glove box. Pentamethylheptane (120 mL), 1-hexene (0.04 mol) and MAO (30 wt % solution in toluene, 0.4 mmol) were injected into the reactor under a nitrogen atmosphere. The solution was then saturated with propylene and stirred for 10 minutes followed by the addition of TiBA-pacified 10-undecen-1-ol (1.0 M, 10 mmol) and catalyst precursor solution (0.4 μmol). Then the reactor was pressurized to the desired set point (4 bar) and the pressure was maintained constant for 20 min. The reaction was stopped by depressurizing the reactor followed by quenching by pouring the mixture into a beaker containing water/isopropanol mixture (50 wt. %, 300 mL) and Irganox 1010 (1.0 M, 0.5 mmol) and the resulting suspension was filtered, washed with demineralized water (2×300 mL) and dried at 60° C. in vacuo overnight (yield 5.9 g). The resulting ionomer product was analyzed by DSC and ICP-MS.

To determine the molecular weight, polydispersity and functionalized comonomer incorporation in the polyolefinic ionomer, the product was dispersed in toluene containing hydrochloric acid (5 M, 1-5 v %) and heated until a clear solution was obtained. The resulting mixture was cooled down and precipitated in an excess iPrOH. The obtained solid was washed with demineralized water and dried at 60° C. in vacuo overnight. The resulting poly(propylene-co-1-hexene-coundecenol) was analyzed by HT-SEC to determine the molecular weight, DSC to determine the T$_g$ and $^1$H NMR to determine the percentage of functionalization.

Example 3

The copolymerization reaction of propylene, 1-hexene and 10-undecenoic acid (entry 1, Table 3) was carried out in a stainless steel Büchi reactor (0.3 L). The reactor, equipped with a mechanical stirrer, was operated at 600 rpm. Heptane (120 mL), 1-hexene (0.04 mol) and a TiBA-pacified 10-undecenoic acid comonomer solution (TiBA:10-undecenoic acid=2:1; 1.0 M, 10 mmol) were added. The reactor was then heated to 40° C. and pressurized with propylene to 4 bar. Meanwhile a pre-activated catalyst solution was prepared in a glovebox by mixing a rac-Me$_2$Si(2-Me-4-Ph-Ind)$_2$ZrCl$_2$ precatalyst solution (0.8 µmol) with a MAO solution (30 wt. % solution in toluene, 0.8 mmol). The activated catalyst solution was injected into the reactor applying an over pressure of nitrogen. The reactor temperature was kept at 40±3° C. by heating with a water LAUDA system and cooling by circulating cold water through an internal spiral-shaped stainless steel tubing inside the reactor. At the end of the reaction, the mixture was transferred into a beaker containing water/isopropanol mixture (500 mL) and Irganox 1010 (1.0 M, 0.5 mmol) and the resulting suspension was filtered, washed with demineralized water (2×300 mL) and dried at 60° C. in vacuo overnight (yield 7.4 g). The resulting ionomer product was analyzed by DSC and ICP-MS.

Example 4

The same polymerization procedure as described in example 3 was applied With this difference that at the end of reaction, the produced polymer was transferred under N$_2$ atmosphere using a bottom drain valve into a glass flask containing 0.5 L of saturated aqueous NaCl solution. Irganox 1010 (1.0 M, 0.5 mL) was added and the resulting mixture was stirred at 70° C. in an oil bath under N$_2$ atmosphere for 2 h. The resulting suspension was filtered, washed with iPrOH (200 mL) and dried at 60° C. in vacuo over night (6.8 g). The ionomer product obtained was analyzed by DSC.

Example 5

Part of the polyolefinic ionomer product of Example 4 (2.0 g) was dispersed in toluene containing hydrochloric acid (5 M, 2.5 v.%) and heated until a clear solution was obtained. The resulting mixture was precipitated in an excess iPrOH. The solid was washed with demineralized water (2×200 mL), iPrOH (2×200 mL) and dried at 60° C. in vacuo overnight (Product B). The poly(propylene-co-1-hexene-co-undecenoic acid) was analyzed by DSC and ICP-MS.

Example 6

The acid functionalized olefin copolymer product of Example 5 (1.7 g) was dispersed in toluene and heated until a clear solution was obtained. Et$_3$N (1 mL) was added and the mixture was stirred at 90° C. for 1 h. Next, the product was precipitated in an excess iPrOH, filtered and dried at 60° C. in vacuo overnight. The poly(propylene-co-1-hexene-co-undecenoic acid)-based ammonium ionomer was analyzed by DSC.

TABLE 1

Copolymerizations of propylene with 10-undecenoic acid or 10-undecen-1-ol using rac-Me$_2$Si(2-Me-4-Ph-Ind)$_2$ZrCl$_2$/MAO catalyst.[a]

| Entry # | TiBA:10-undecenol[b] (mmol) | TiBA:10-undecenoic acid[c] (mmol) | Yield[d] (g) | T$_m$ (° C.) | Melting enthalpy (J/g) | Com. incorp. (mol. %) | Al (wt. %) |
|---|---|---|---|---|---|---|---|
| 1 | — | 25 | 57 | 136 | 30 | 1.2 | 1.26 |
| 2 | — | 10 | 46 | 150 | 59 | 0.3 | 0.24 |
| 3 | 20 | — | 59 | 143 | 55 | 0.8 | 0.28 |
| 4 | 10 | — | 88 | 147 | 61 | 0.3 | 0.32 |

[a] Conditions: rac-Me2Si(2-Me-4-Ph-Ind)2ZrCl2 catalyst precursor (6.4 µmol), TiBA (1.0M solution in toluene) 4 mL, MAO (30 wt % solution in toluene) 9 mmol, DEZ (1.0M solution in toluene) 1 mmol, C$_3^=$ monomer 9 bar, Pentamethlheptane diluent 1 L, reaction temperature 87° C.
[b] Comonomer 10-undecenol (1.0M solution in toluene), TiBA:10-undecenol 1:1.
[c] Comonomer 10-undecenoic acid (1.0M solution in toluene), TiBA:10-undecenoic acid 2:1.
[d] The yield was obtained under non-optimized conditions and determined using the weight of polymer obtained after filtration and drying in vacuum oven overnight at 60° C.

TABLE 2

Copolymerization of propylene with 10-undecenol and 1-hexene using rac-Me$_2$Si(2-Me-4-Ph-Ind)$_2$ZrCl$_2$/MAO catalyst.[a]

| Entry # | Catalyst (µmol) | 1-hexene (mol) | Yield (g)[b] | T$_m$ (° C.) | Melting enthalpy (J/g) | Com. incorp. (mol. %) | Al (wt. %) |
|---|---|---|---|---|---|---|---|
| 1 | 0.8 | 0.04 | 13.7 | 136 | 43 | 2.0 | 1.63 |
| 2 | 0.8 | 004 | 11.5 | 134 | 41 | 1.9 | 1.20 |
| 3 | 0.4 | 0.04 | 5.9 | 105 | 19 | 1.7 | 0.98 |
| 4 | 0.4 | 0.08 | 3.8 | 78 | 16 | 2.1 | 1.11 |
| 5 | 0.4 | 0.08 | 4.2 | 85 | 18 | 1.5 | 0.75 |

[a] Conditions: TiBA scavenger (1.0M solution in toluene) 1 mL, MAO (30 wt % solution in toluene) Al/Zr~1000, C$_3^=$ monomer 4 bar, TiBA-pacified 10-undecen-1-ol comonomer solution (TiBA:10-undecen-1-ol = 1:1; 1.0M, 10 mmol), pentamethyl heptane 120 mL, reaction temperature 40° C., reaction time 20 min.
[b] The yield was obtained under non-optimized conditions and was determined using the weight of polymer obtained after filtration and drying in vacuum oven overnight at 60° C.
[c] DEZ (1.0M solution in toluene) 0.3 mL was added.

TABLE 3

Copolymerization of propylene with 10-undecenoic acid and 1-hexene using rac-Me$_2$Si(2-Me-4-Ph-Ind)$_2$ZrCl$_2$/MAO catalyst.[a]

| Entry # | 1-hexene (mol) | Yield (g)[b] | Tm (° C.) | Melting. enthalpy (J/g) | Com. incorp. (mol. %) | Al (wt. %) |
|---|---|---|---|---|---|---|
| 1 | 0.04 | 7.4 | 81 | 36 | 1.3 | 1.28 |
| 2 | 0.08 | 3.5 | 65 | 23 | 1.9 | 1.65 |
| 3 | 0.12 | 2.9 | 40 | 21 | 1.8 | 1.74 |

[a] Conditions: rac-Me2Si(2-Me-4-Ph-Ind)2ZrCl2 catalyst precursor (0.8 µmol), MAO (30 wt % solution in toluene) Al/Zr~1000, C$_3^=$ monomer 4 bar, TiBA-pacified 10-undecenoic acid comonomer (TiBA: 10-undecenoic acid = 2:1, 1.0M, 10 mmol), heptane 120 mL, reaction temperature 40° C., reaction time 20 min.
[b] The yield was obtained under non-optimized conditions and was determined using the weight of polymer obtained after filtration and drying in vacuum oven overnight at 60° C.

The invention claimed is:
1. A process for the manufacture of a semi-crystalline polyolefinic ionomer comprising the steps of:
   a1) copolymerizing at least one olefin monomer and at least one masked functionalized olefin monomer in the presence of a catalyst system, wherein the at least one olefin monomer is represented by CH$_2$=CHR$^1$, wherein R$^1$ is an alkyl group having 1 to 6 carbon atoms, wherein the at least one masked functionalized olefin monomer is a reaction product of a functionalized olefin monomer represented by the structure according to Formula (I) and a masking agent:

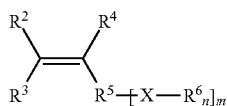

wherein R$^2$, R$^3$, and R$^4$ are each independently selected from the group consisting of H and hydrocarbyl with 1 to 16 carbon atoms, wherein R$^5$—[X—(R$^6$)$_n$]$_m$ is a polar functional group containing one or multiple heteroatom containing functionalities X—(R$^6$)$_n$ wherein X is selected from —O—, —S— or —CO$_2$— and R$^6$ is H, and n is 1, or X is N and R$^6$ is each independently selected from the group consisting of H and a hydrocarbyl group with 1 to 16 carbon atoms, and n is 2, wherein R$^5$ is either —C(R$^{7a}$)(R$^{7b}$)— or a plurality of —C(R$^{7a}$)(R$^{7b}$)— groups, wherein R$^{7a}$, and R$^{7b}$ are each independently selected from the group consisting of H or hydrocarbyl with 1 to 16 carbon atoms and R$^5$ comprises 1 to 10 carbon atoms, wherein R$^3$ and R$^5$ may together form a ring structure that is functionalized with one or multiple X—(R$^6$)$_n$, where X is attached to either a main chain or side chain of R$^5$, where m is an entire number between 1 and 10, and either b1) treating a product of step a1) with a protic solution containing a metal salt, an ammonium salt or an amine to perform an exchange reaction, or a2) contacting a product of a1) with a Brønsted acid solution to abstract a residue derived from the masking agent from a functionalized olefin copolymer of step a1) to obtain a semi-crystalline functionalized olefin copolymer comprising the at least one olefin monomer and the functionalized olefin monomer, and either b2) treating a product of step a2) with a monovalent metal salt, a monocationic ammonium salt or a monofunctional amine, or b3) treating a product of step a2) with a multi-valent metal salt, a polycationic ammonium salt or a polyfunctional amine.

2. The process of claim 1, wherein the at least one olefin monomer is selected from the group consisting of propylene, 1-butene, 3-methyl-1-butene, 1-pentene, 4-methyl-1-pentene, 1-hexene, vinyl cyclohexane and 1-octene.

3. The process of claim 1, wherein the functionalized olefin monomer is selected from the group consisting of allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol, 10-undecene-1-ol, 5-norbornene-2-methanol, 3-butenoic acid, 4-pentenoic acid or 10-undecenoic acid.

4. The process of claim 1, wherein an amount of the at least one masked functionalized olefin monomer in step a1) is from 0.01 to 30 mol %, with respect to a total molar amount of the at least one olefin monomer and the at least one masked functionalized olefin monomer.

5. The process of claim 1, wherein the masking agent is selected from trialkyl aluminum complexes, dialkyl magnesium complexes, dialkyl zinc complexes or trialkyl boron complexes.

6. The process of claim 1, wherein in step b1) or b2) the metal salt or monovalent metal salt is a fluoride, chloride, bromide, iodide, hydroxide, nitrite, nitrate, formate, acetate, bicarbonate, carbonate, sulfite, sulfate, chlorate, perchlorate, bromate or EDTA salt of a metal selected from one or more of lithium, sodium, potassium or silver.

7. The process according to claim 1, wherein in step b3) the multi-valent metal salt is a fluoride, chloride, bromide, iodide, hydroxide, nitrite, nitrate, formate, acetate, bicarbonate, carbonate, sulfite, sulfate, chlorate, perchlorate, bromate or EDTA salt of magnesium, calcium, strontium, barium, zinc, copper, tin, silver, iron, chromium, aluminum or gallium.

8. The process of claim 1, wherein, the Brønsted acid solution used in step a2) comprises inorganic and/or organic acids.

9. The process of claim 1, wherein the at least one olefin monomer is a first and a second olefin monomer, wherein the first and second olefin monomers are different and wherein an amount of the first olefin monomer is at least 75 mol %, and an amount of second olefin monomer is at most 25 mol %, the mol % based on a total molar amount of first and second olefin monomer.

10. The process of claim 9 wherein the first olefin monomer is propylene and the second olefin monomer is 1-hexene.

11. A semi-crystalline polyolefinic ionomer obtained by the process of claim 1.

12. The semi-crystalline polyolefinic ionomer of claim 11 wherein, said at least one olefin monomer is selected from the group consisting of propylene, 1-butene, 3-methyl-1-butene, 1-pentene, 4-methyl-1-pentene, 1-hexene, vinyl cyclohexane and 1-octene, said functionalized olefin monomer is selected from the group consisting of allyl alcohol, 3-buten-1-ol, 3-buten-2-ol, 3-buten-1,2-diol, 5-hexene-1-ol, 5-hexene-1,2-diol, 7-octen-1-ol, 7-octen-1,2-diol, 9-decen-1-ol, 10-undecene-1-ol, 5-norbornene-2-methanol, 3-butenoic acid, 4-pentenoic acid or 10-undecenoic acid, wherein functionalized groups in the semi-crystalline polyolefinic ionomer are cross-linked by means of one or more selected from the group consisting of monovalent metal ions, monocationic ammonium ions, monofunctional amines, multi-valent metal ions, polycationic ammonium ions and polyfunctional amines.

13. The semi-crystalline polyolefinic ionomer according to claim 11 comprising between 0.1 and 10 molar equivalent, of a metal salt, an ammonium salt or an amine with respect to a mol % of functionalized olefin monomer incorporated in the semi-crystalline polyolefinic ionomer.

14. The process of claim 1, wherein the at least one olefin monomer is propylene, 1-hexene, or a combination thereof.

15. The process of claim 1, wherein the functionalized olefin monomer is buten-1-ol, 3-buten-2-ol, 10-undecene-1-ol, 4-pentenoic acid or 10-undecenoic acid.

16. The process of claim 1, wherein an amount of the at least one masked functionalized olefin monomer in step a1) is from 0.02 to 20 mol %, with respect to a total molar amount of the at least one olefin monomer and the at least one masked functionalized olefin monomer.

17. The process of claim 1, wherein the monofunctional amine is selected from $NH_3$, $Me_2NH$, $NMe_3$, $EtNH_2$, $Et_3N$, or $BuNH_2$.

18. The process of claim 1, wherein the moncationic ammonium salt is a fluoride, chloride, bromide, iodide, hydroxide, nitrite, nitrate, formate, acetate, bicarbonate, carbonate, sulfite, sulfate, chlorate, perchlorate or bromate salt of $NH_4^+$, $Et_3NH^+$, or $Bu_4N^+$.

19. The process according to claim 1, wherein the polyfunctional amine is selected from ethylene diamine, N,N,N',N'-tetramethyl ethylene diamine, 1,3-diaminopropane, hexamethylenediamine, piperazine, diethylene triamine, N,N,N',N",N"-pentamethyl diethylene triamine, or polyethylenimine.

* * * * *